(12) United States Patent
Sanchez et al.

(10) Patent No.: US 11,138,814 B1
(45) Date of Patent: Oct. 5, 2021

(54) TECHNOLOGY FOR IMPLEMENTING A REVERSE COMMUNICATION SESSION FOR AUTOMOTIVE DEVICES

(71) Applicant: STATE FARM MUTUAL AUTOMOBILE INSURANCE COMPANY, Bloomington, IL (US)

(72) Inventors: Kenneth J. Sanchez, San Francisco, CA (US); Eric Dahl, Newman Lake, WA (US); Steven J. Harris, Saratoga, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 359 days.

(21) Appl. No.: 16/380,448

(22) Filed: Apr. 10, 2019

(51) Int. Cl.
| | | |
|---|---|---|
| *G07C 5/00* | (2006.01) | |
| *G07C 5/08* | (2006.01) | |
| *G08B 27/00* | (2006.01) | |
| *G08B 25/10* | (2006.01) | |
| *G06Q 10/08* | (2012.01) | |

(52) U.S. Cl.
CPC ......... *G07C 5/006* (2013.01); *G06Q 10/0875* (2013.01); *G07C 5/008* (2013.01); *G07C 5/0808* (2013.01); *G08B 25/10* (2013.01); *G08B 27/008* (2013.01)

(58) Field of Classification Search
CPC ...... G07C 5/006; G07C 5/0808; G07C 5/008; G08B 27/008; G08B 25/10; G06Q 10/0875
See application file for complete search history.

(56) References Cited

U.S. PATENT DOCUMENTS

| | | | | |
|---|---|---|---|---|
| 10,055,793 | B1* | 8/2018 | Call | G06Q 40/08 |
| 10,475,127 | B1* | 11/2019 | Potter | G06Q 40/08 |
| 11,014,567 | B1* | 5/2021 | Fields | B60W 40/08 |
| 2015/0332407 | A1* | 11/2015 | Wilson, II | G07C 5/0808 |
| | | | | 705/4 |
| 2021/0019759 | A1* | 1/2021 | Pede | G06Q 30/018 |

* cited by examiner

*Primary Examiner* — Phung Nguyen
(74) *Attorney, Agent, or Firm* — Marshall, Gerstein & Borun LLP (57) ABSTRACT

Systems and methods relate to, inter alia, receiving a set of sensor data from a set of sensors communicatively coupled to the electronic mobile device. The systems and methods may further include determining automatically from the set of sensor data that the collision event occurred during the operation of the automotive device. The systems and methods may further include initiating, in response to determining that the collision event occurred, a reverse communication session between the electronic mobile device and a collision management server. The electronic mobile device, via the initiated reverse communication session, may be configured to receive a first offer from a first service provider and a second offer from a second service provider. The first offer and the second offer are for servicing the automotive device by the first service provider and the second service provider, respectively.

20 Claims, 6 Drawing Sheets

SERVICE PROVIDER SEARCH RESULTS

| NAME | OFFER | DISTANCE | RATING | AVAILABILITY | EST. PICKUP |
|---|---|---|---|---|---|
| SP 1 | $1000 | 5 MI | ★☆☆ | 09/15/2016 | 09/18/2016 |
| SP 2 | $1500 | 8 MI | ★★☆ | 09/15/2016 | 09/21/2016 |
| SP 3 | $2000 | 1.5 MI | ★★★ | 09/15/2016 | 09/27/2016 |

SELECT SERVICE PROVIDER(S) FOR AN APPOINTMENT

USER DEFAULT SETTINGS

SHOW RESULTS OF SERVICE PROVIDERS WITHIN ___ MILES OF COLLISION EVENT

SEND ALL DIAGNOSTIC INFO TO SERVICE PROVIDERS

PROVIDE PROMPT TO SELECT DIAGNOSTIC INFO TO SEND TO SERVICE PROVIDERS

AVAILABLE WITHIN ___ DAYS OF COLLISION EVENT

SHOW OFFERS FROM LEAST TO GREATEST

TECHNOLOGY FOR IMPLEMENTING A REVERSE COMMUNICATION SESSION FOR AUTOMOTIVE DEVICES

TECHNICAL FIELD

The present disclosure is directed to managing collision events involving one or more automotive devices. More particularly, the present disclosure is directed to systems and methods for collecting and aggregating data associated with collision events, and automatically initiating a reverse communication session accordingly.

BACKGROUND

Individuals have been operating and traveling in vehicles as a means of transportation for decades. Unfortunately, vehicles are regularly involved in collision events that may result in or lead to damage, injuries, congestion, or other conditions. Gathering information associated with collision events is difficult and unreliable. Additionally, even when information associated with collision events is able to be gathered, managing the effects of collision events is inefficient and challenging. In particular, individuals associated with the collision events must assess (or have someone else assess) what needs to be addressed (e.g., vehicle damage, bodily injury), which may result in an inaccurate assessment. Further, the individuals must reach out to service providers to verbally describe the collision event prior to receiving price quotes from the service providers, which leads to a disparity of price quotes because each service provider may assess the collision event differently.

Accordingly, there is an opportunity for systems and methods to dynamically and automatically collect and aggregate information related to collision events, and dynamically and automatically initiate a reverse communication session to address effects of the collision events and increase transparency between individuals associated with the collision events and service providers.

BRIEF SUMMARY

According to embodiments, a computer-implemented method in an electronic mobile device of managing collision events is provided. The method may include receiving a set of sensor data from a set of sensors communicatively coupled to the electronic mobile device. The set of sensors may be fixedly installed in an automotive device (e.g., cars, trucks, self-driving vehicles, and the likes) and configured to monitor the set of sensor data during operation of the automotive device. The method may further include determining automatically from the set of sensor data that the collision event occurred during the operation of the automotive device. The collision event may have an associated type. The method may further include initiating, in response to determining that the collision event occurred, a reverse communication session between the electronic mobile device and a collision management server via an external communication link between the electronic mobile device and the collision management server. The electronic mobile device, via the initiated reverse communication session, may be configured to receive, from the collision management server, a first offer from a first service provider and a second offer from a second service provider. The first offer and the second offer are for servicing the automotive device by the first service provider and the second service provider, respectively. Further, the first service provider and the second provider are capable of servicing the automotive device and thus can be considered to be associated with the associated type of the collision event.

In another embodiment, an electronic mobile device configured to manage collision events is provided. The electronic mobile device may include a transceiver configured to communicate via a wireless network connection, a memory configured to store non-transitory computer executable instructions, and a processor configured to interface with the transceiver and the memory. The processor may be configured to execute the non-transitory computer executable instructions to cause the processor to receive a set of sensor data from a set of sensors communicatively coupled to the electronic mobile device. The set of sensors may be fixedly installed in an automotive device (e.g., cars, trucks, self-driving vehicles, and the likes) and configured to monitor the set of sensor data during operation of the automotive device. The processor may further determine, automatically from the set of sensor data, that the collision event occurred during the operation of the automotive device. The collision event may have an associated type. The processor may further, in response to determining that the collision event occurred, initiate a reverse communication session between the electronic mobile device and a collision management server via an external communication link between the electronic mobile device and the collision management server. The electronic mobile device, via the initiated reverse communication session, may be configured to receive, from the collision management server, a first offer from a first service provider and a second offer from a second service provider. The first offer and the second offer are for servicing the automotive device by the first service provider and the second service provider, respectively. Further the first service provider and the second provider are capable of servicing the automotive device and thus can be considered to be associated with the associated type of the collision event.

BRIEF DESCRIPTION OF THE DRAWINGS

There are shown in the drawings arrangements which are presently discussed, it being understood, however, that the present embodiments are not limited to the precise arrangements and instrumentalities shown, wherein.

DETAILED DESCRIPTION

The present embodiments may generally relate to, inter alia, automatically assessing and managing effects that result from collision events. In particular, the present embodiments may automatically detect an occurrence of a collision event as well as determine any damage, injury, or the like that may have incurred as a result of the collision event. Further, the present embodiments may initiate a reverse communication session for receiving offers from service providers that are offering their services to attend to the determined effect(s), and upon selection of one of the service providers, automatically schedule an appointment with the service provider.

Currently, when a collision event occurs, an individual affected by the collision event (e.g., an individual who suffers an injury and/or whose automotive device is damaged) must wait for a relevant individual (e.g., a mechanic, medical personnel) to assess damage or other effects. When the individual inquires various service providers for price quotes, the service providers may provide a wide disparity of price quotes because the individual may provide an inaccurate assessment, or the service providers may have different ways to assess what needs to be addressed. In these situations, the individual would not know whether the wide disparity of price quotes is due to the quality of service of the service providers, arbitrary inflation of the price of service, or various assessments of the same collision event. Further, the individual must reach out to and wait for all requested service providers to report back their price quotes. If the individual desires to negotiate price quotes by verbally counteroffering a service provider's price quote with that of another, the service provider has no way of knowing whether the counteroffer is legitimate.

Additionally, the affected individual must somehow schedule a medical or service appointment to attend to the effect(s). In other words, there are multiple additional steps that the individual must manually undergo or perform when a collision event occurs.

According to certain aspects, the present systems and methods dynamically and automatically facilitate operations in response to collision events. In particular, the systems and methods may retrieve sensor data representative of automotive device operation data and, based upon the sensor data, determine that a collision event occurred as well as determine any effects resulting from the collision event. The systems and methods may initiate a reverse communication session to share the determined effects resulting from the collision with relevant service providers capable of addressing the effects in order for the service providers to place offers for their services. The systems and methods may share the offers with all service providers involved in the reverse communication session to facilitate counteroffers that may be made by any of the service providers. Further, the systems and methods may facilitate scheduling an appointment with the relevant service provider based upon availability and/or other information.

The systems and methods therefore offer numerous benefits. In particular, the systems and methods dynamically and automatically initiate a reverse communication session, where relevant service providers may all receive the same automatically measured effects resulting from the collision event in order to provide offers for their services. The systems and methods may share the offers with all service providers involved in the reverse communication session so that service providers understand the competition for servicing the effects. The systems and methods dynamically and automatically schedule an appointment with one of the service providers upon selection by the individual. This not only negates the need for manual assessment by third parties (e.g., medical personnel and service shops), manual bargain shopping, and manual scheduling of appointments by the affected individual, but also increases transparency between the individual associated with the collision events and service providers. For instance, service providers receive sensor-measured effects resulting from the collision event that are likely to be more accurate assessments of the effects compared to verbal descriptions made by individuals. Individuals can shop with confidence when deciding which service provider to choose, knowing that the offers of each service provider are at least based upon the same provided assessment of the same collision event, and that the service providers were given an opportunity to view offers of other service providers. It should be appreciated that other benefits are envisioned.

The systems and methods discussed herein address a business challenge, namely a business challenge related to assessing, managing, and handling the effects of collision events. This is particularly apparent when there are multiple entities and businesses whose services may be needed. In conventional situations, individuals affected by collision events must manually communicate with service providers and schedule needed appointments. In contrast, the systems and methods utilize multiple electronic devices and entities connected via one or more wireless connections to dynamically assess needed services and automatically schedule corresponding appointments using various information. Therefore, the systems and methods do not merely recite the performance of some business practice known from the pre-Internet world (assessing and managing collision events) along with the requirement to perform it on the Internet. Instead, the systems and methods are necessarily rooted in computer technology in order to overcome a problem specifically arising in computer networks. Further, the systems and methods are improvements over the prior art that require manual assessment by third parties (e.g., medical personnel and service shops), manual bargain shopping, and manual scheduling of appointments by the affected individual.

Further, it should be appreciated that the systems and methods may include specialized (i.e., non-generic) or dedicated components capable of performing specialized (i.e., non-generic) or dedicated computer functions. In particular, the systems and methods employ specialized or dedicated processors to determine automatically from sensor data that a collision event occurred during the operation of the automotive device, and in response, to initiate a reverse communication session.

According to implementations, the systems and methods may support a dynamic, real-time or near-real-time collection, analysis, and communication of any data that may be associated with the assessments. "Dynamic," "real-time," or "near-real-time" collection in the context above will generally mean that it takes about 1 second or less from the time of data acquisition for calculation and data presentation, more often such action is essentially without delay. In any case, dynamic, real-time or near-real-time activity in the subject embodiments concerns manipulation of such a mass of data and calculations that the task is well beyond practicable human capacity, thereby requiring the use of a computer processor. In particular, the systems and methods may dynamically and automatically request and collect sensor data from automotive devices in real-time or near-real-time, may automatically and dynamically analyze the collected sensor data, may automatically and dynamically determine collision events and damage relating thereto, may dynamically and automatically initiate a reverse communication session to share the determined effects resulting from the collision with relevant service providers capable of addressing the effects in order for the service providers to place offers for their services, may dynamically and automatically facilitate counteroffers that may be made by any of the service providers, and may automatically and dynamically schedule appointments to address the damage.

The term "collision event" as used herein may be used to refer to any collision or incident involving one or more automotive devices that collide with each other, and/or make contact with one or more other objects and/or individuals. It should be appreciated that a collision event may also refer to an instance in which an automotive device breaks down, experiences a malfunction, or otherwise ceases to operate. Certain collision events may result in one or more affected or impacted individuals.

Figure 1:
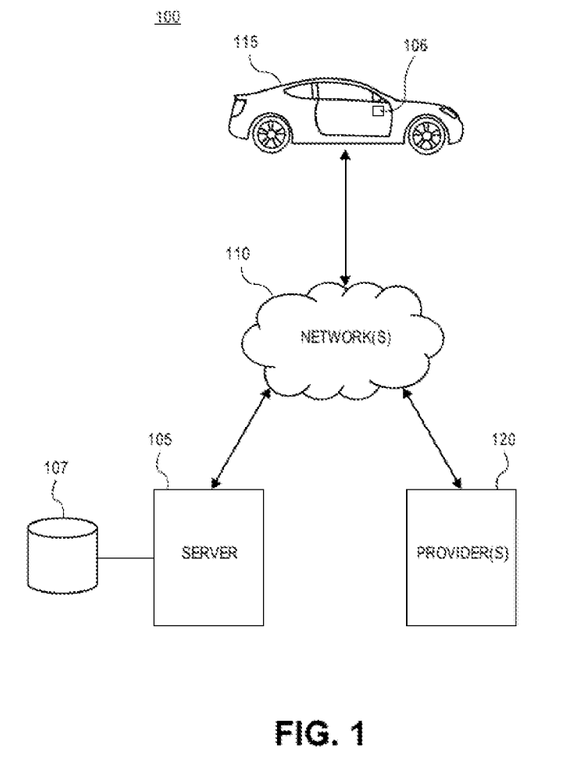
FIG. 1 depicts an overview of an exemplary system of components configured to facilitate various functionalities, in accordance with some embodiments.

FIG. 1 illustrates an overview of a system 100 of components configured to facilitate the systems and methods. It should be appreciated that the system 100 is merely exemplary and that alternative or additional components are envisioned.

As illustrated in FIG. 1, the system 100 depicts, as an example of an automotive device, a vehicle 115. Although FIG. 1 depicts a single vehicle, it should be appreciated that additional vehicles are envisioned. The vehicle 115 may have at least one associated individual, such as an operator and/or a passenger of the vehicle 115.

The vehicle 115 may have an associated electronic mobile device 106. According to embodiments, the electronic mobile device 106 may be configured with any combination of software and hardware components. In some implementations, the electronic mobile device 106 may be included as part of an on-board diagnostic (OBD) system or any other type of system configured to be installed in the vehicle 115, such as an original equipment manufacturer (OEM) system. In other implementations, the electronic mobile device 106 may belong to the individual associated with the vehicle 115. In particular, the electronic mobile device 106 may be any type of electronic mobile device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like.

The electronic mobile device 106 may include a set of sensors configured to detect and record various telematics data associated with the vehicle 115. In some implementations, the electronic mobile device 106 may be configured to communicate with (i.e., request, retrieve, or receive data from) a set of sensors disposed within the vehicle 115. According to embodiments, the set of sensors included in the electronic mobile device 106 or otherwise configured to communicate with the electronic mobile device 106 may be of various types. For example, the set of sensors may include a location module (e.g., a global positioning system (GPS) chip), an image sensor, an accelerometer, an ignition sensor, a clock, a speedometer, a torque sensor, a throttle position sensor, a compass, a yaw rate sensor, a tilt sensor, a steering angle sensor, a brake sensor, a collision sensor, a damage sensor, and/or other sensors. It should be appreciated that additional sensors are envisioned.

Although not illustrated in FIG. 1, it should be appreciated that the electronic mobile device 106 may be configured to communication with other electronic mobile devices, such as those associated with individual and/or with additional automotive devices. In this implementation, the electronic mobile device 106 may be configured to communicate with each other via a network connection such as one or more short range communication protocols such as radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies. Generally, the network connection may enable the electronic mobile devices to form a "mesh" network, whereby the electronic mobile devices may automatically connect to one another when in range. When connected, the electronic mobile devices may request, retrieve, access, and/or transmit data thereamongst.

The system 100 may further include a collision management server 105 that may be configured to communicate with the electronic mobile device 106 via an external communication link, such as one or more networks 110. In certain embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The collision management server 105 may be configured to interface with or support a memory or storage 107 capable of storing various data, such as profile information of various service providers, including, inter alia, their availability, reviews, reliability scores, current service workload, location, and/or any suitable service provider data.

Additionally, the system 100 may include one or more service providers 120 that may represent any business, corporation, entity, company, individual or group of individuals, and/or the like, that may offer a service capable of addressing effects of collision events. For example, one of the service providers 120 may be a tow truck company, another of the service providers 120 may be an ambulance service (or a hospital), another of the service providers 120 may be an auto body shop. It should be appreciated that many types of service providers 120 are envisioned. As illustrated in FIG. 1, the electronic mobile device 106 and the collision management server 105 may be capable of communicating with the service provider(s) 120 via the network(s) 110.

According to embodiments, the electronic mobile device 106 may collect sensor data from one or more sensors and determine, from the collected sensor data, that a collision event has occurred, where the collision event may have a particular type. For example, the sensor data may indicate damage to the vehicle 115 (and/or to another vehicle), thus designating the collision event as a vehicle damage type. As another example, the sensor data may indicate that an individual suffered bodily injury, or that there is a high probability that bodily injury occurred, thus designating the collision event as a human injury type.

In response to determining that the collision event has occurred, the electronic mobile device 106 may initiate a reverse communication session between the electronic mobile device 106 and the collision management server 105 via the external communication link (e.g., network 110) between the electronic mobile device 106 and the collision management server 105. During the reverse communication session, the electronic mobile device 106 may transmit a damage rating indicative of the assessed damage determined from the sensor data, a current or individual-specified location of the vehicle 115, or both, to the collision management server 105. The electronic mobile device 106 may subsequently receive, from the collision management server 105, offers from service providers 120 that indicate offers to service the vehicle 115, according to the damage rating, location of the vehicle 115, or both. The electronic mobile device 106 may then generate a list populated with pairings of the offers with the service providers 120 and further display the generated list to enable selection of one of the service providers 120. The electronic mobile device 106 may automatically schedule an appointment, service, or the like with the selected service provider 120. Accordingly, the individual associated with the electronic mobile device 106 may view a dynamically and automatically created list that shows offers from service providers 120, knowing that each service provider 120 was provided the same assessment of the collision event. The selected service provider 120 may address the identified effect(s) of the collision event according to the scheduled appointment without the affected individual having to manually assess the collision event and make an appointment.

Figure 2:
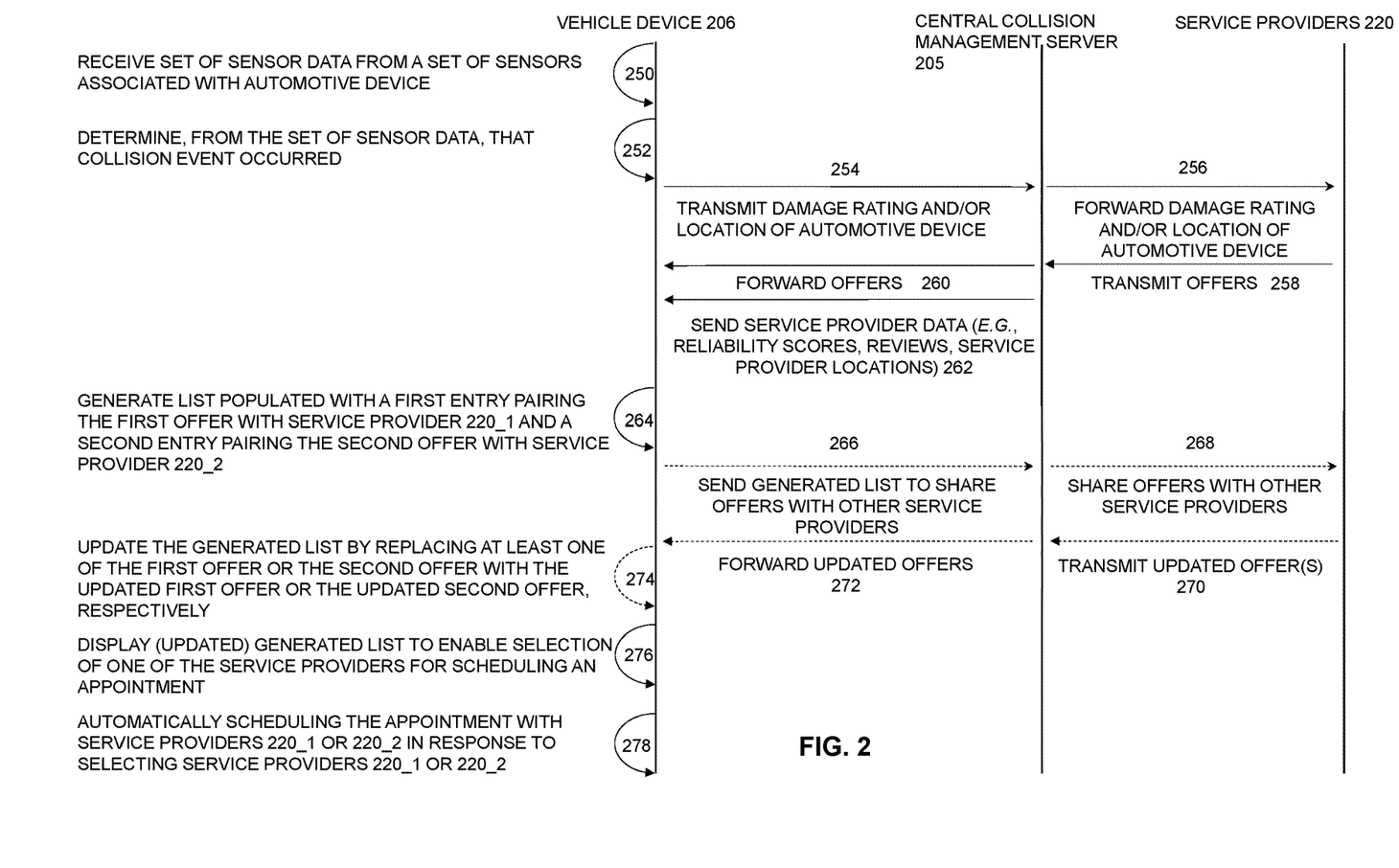
FIG. 2 depicts an exemplary signal diagram associated with assessing and managing collision events, in accordance with some embodiments.

FIG. 2 depicts a signal diagram 200 associated with certain functionalities related to automatically initiating a reverse communication session in response to collision events. The signal diagram 200 includes various components, including a central collision management server 205 (such as the collision management server 105 as discussed with respect to FIG. 1), a vehicle device 206 (such as the electronic mobile device 106 as discussed with respect to FIG. 1), and at least two service providers 220 (such as the service providers 120 as discussed with respect to FIG. 1). Although FIG. 2 depicts a single vehicle device 206 and two service providers 220 (e.g., 220_1 and 220_2), it should be appreciated that additional vehicle devices, servers, and service providers are envisioned. According to embodiments, the vehicle device 206 may interface and communicate with the central collision management server 205 according to the signal diagram 200. In a particular implementation, the vehicle device 206 may support and execute one or more applications configured to facilitate the communications and functionalities as described herein.

The signal diagram 200 may begin with the vehicle device 206 receiving (250) sensor data from a set of sensors communicatively coupled to the vehicle device 206. The set of sensors may be configured to monitor the set of sensor data during operation of the automotive device. In some embodiments, the vehicle device 206 may access the sensor data continuously (or periodically) and during normal operation of the automotive device, or may access the sensor data in response to a certain trigger. For example, the vehicle device 206 may access the sensor data in response to certain operation data meeting or exceeding a threshold value (e.g., automotive device sensors detecting automotive device damage, a strong braking event, or the likes). The set of sensors may be fixedly installed in the automotive device to which the vehicle device 206 may connect, integrated within the vehicle device 206, or otherwise associated with the automotive device.

According to embodiments, the sensor data may include data indicative of general automotive device operation including, but not limited to, times and dates when the automotive device is operating (including start time and end time), travel locations or routes (including origin locations and destination locations), distances traveled, speed or velocity, various telematics data (e.g., hard turns, sharp accelerations, hard brakes, or the likes), image data, audio data, and/or the like.

The vehicle device 206 may analyze (252) the sensor data. In particular, the vehicle device 206 may analyze the sensor data to determine whether a collision event has occurred. In some implementations, the sensor data may explicitly indicate a collision event. For example, the sensor data may indicate damage to the automotive device. In other implementations, the sensor data may not explicitly indicate a collision event, in which case the vehicle device 206 may determine a certain likelihood of a collision event based upon the sensor data, where the vehicle device 206 may deem that a collision event occurred when the certain likelihood at least meets a threshold value. The vehicle device 206 may also identify or determine a time and a location associated with the collision event (i.e., when and where the collision event occurred). Further, in some embodiments, the vehicle device 206 may access or retrieve parameters, calculation modules, algorithms, and/or the like, such as those associated with the threshold value, to be used in the determination.

If a collision event did not occur, processing may return to (250), or may proceed to other functionality. If a collision event did occur, the vehicle device 206 may determine and transmit (254) a damage rating of the collision event and/or other characteristics associated with the collision event, such as the location of the collision event, to the central collision management server 205 to initiate a reverse communication session. In particular, the sensor data may indicate actual or potential damage to the automotive device or to an individual associated with the automotive device (e.g., a passenger). Any automotive device damage may correspond to one or more parts or sections of the automotive device. For example, the sensor data may indicate that there is damage to the front bumper and the engine of an automotive device. In embodiments, the sensor data itself may indicate actual damage to the part or section of the automotive device, or the vehicle device 206 may analyze the sensor data to calculate a probability of damage to a particular part or section of the automotive device.

The vehicle device 206 may also estimate, based upon the sensor data, whether an individual associated with the automotive device may be injured, as well as what type of injury the individual may have sustained. For example, the sensor data may indicate that the air bag deployed, in which case the vehicle device 206 may calculate a likelihood that the driver has a head injury and/or whiplash. As another example, the sensor data may indicate that the driver's side door of the automotive device was impacted, in which case the vehicle device 206 may calculate a likelihood that the driver sustained an injury on his/her left side.

In determining the damage rating of collision event, the vehicle device 206 may determine a type of service provider that may be needed to assist with or address effects of the collision event. In embodiments, certain service providers may specialize in attending to different types of damage to either the automotive device or to an individual. For example, if the sensor data indicates that the automotive device is rendered inoperable, then the vehicle device 206 may determine that a tow truck company is a relevant service provider. As another example, if the sensor data indicates that the frame or body of the automotive device is damaged, then the vehicle device 206 may determine that an auto body shop is a relevant service provider. Additionally, for example, if the vehicle device 206 determines that there is a higher probability of injury to an individual, then the vehicle device 206 may determine that an emergency medical provider (e.g., an ambulance service) is a relevant service provider. It should be appreciated that various service providers that may assist with or attend to various situations associated with or effects of collision events are envisioned.

The vehicle device 206 may transmit the damage rating and/or the location of the automotive device to the central collision management server 205. The damage rating may be raw data, such as the accessed set of sensor data, or may be processed data, such as the result of any calculation, technique, algorithm, and/or the like applied to the raw data by the vehicle device 206. In some embodiments, if the damage rating is raw data, the central collision management server 205 may be equipped with one or more applications that apply a calculation, technique, algorithm, and/or the like to the raw data. The location of the automotive device may be geographical coordinates obtained from a location module (e.g., a GPS module). Upon receipt, the central collision management server 205 may forward (256) the damage rating and/or the location of the automotive device to the service providers 220. Each service provider 220 may offer an offer based upon the damage rating and/or the location of the automotive device and transmit (258) the offer to the central collision management server 205. The central collision management server 205 may then forward (260) the offers to the vehicle device 206. The central collision management server 205 may also transmit (262) other service provider data related to the service providers 220 that offered the offers, such as availability, reviews, reliability scores, current service workload, location, and/or any suitable service provider information.

In other embodiments, rather than having the central collision management server 205 forward the offers to the vehicle device 206, the central collision management server 205 may automatically share the offers received from the service providers with the other service providers to facilitate counteroffers that may be made by any of the service providers. For instance, if the service providers 220 are able to see each other's offers, some of the service providers 220 may desire to provide an updated offer (e.g., a lower offer) back to the central collision management server 205 to win the individual's favor. The central collision management server 205 may then forward the original and/or updated offers to the vehicle device 206.

In other embodiments, rather than having the central collision management server 205 transmit service provider information related to the service providers 220 automatically along with the offers, the vehicle device 206 may request for particular service provider information from the central collision management server 205. For example, the vehicle device 206 may send a request to the central collision management server 205 that may indicate a type of service provider as well as a need for availability information of the service provider to assist with the identified damage resulting from the collision event. The request may indicate one or more preferred or available times or dates for appointments. Further, the request may indicate a location of the vehicle device 206, which may be used to identify the service provider (i.e., those service providers within a vicinity of the location). In these embodiments, the vehicle device 206 may automatically interface with a calendar application to automatically identify the preferred or available times or dates.

In embodiments, the central collision management server 205 may interface with the service provider(s) 220 to retrieve any requested information. The central collision management server 205 may locally store any service provider information (e.g., calendar availability, reviews, reliability score, location, current service workload), or may automatically and dynamically retrieve requested information in response to receiving a request from the vehicle device 206. For example, reviews and reliability scores of the service provider(s) 220 may include opinions and metrics from other customers or other third party entities that indicate the service providers' level of service and/or expertise as to how well the service provider(s) 220 were able to attend to or assist with similar collision events. The workload of the service provider(s) 220 may include the current amount of service they have already committed to based upon their schedule and/or calendar. Although not illustrated in FIG. 2, it should be appreciated that the vehicle device 206 may interface directly with the service provider(s) 220 to request information and receive the requested information. After accessing or retrieving the service provider information, the central collision management server 205 may send (262) the service provider information to the vehicle device 206.

In some embodiments, although not pictured, upon receipt of the offers and/or any other service provider information, the vehicle device 206 may send a request to the central collision management server 205 to share the offers with the other service providers 220. If the service providers 220 are able to see each other's offers, some of the service providers 220 may desire to provide an updated offer (e.g., a lower offer) to win the individuals' favor. Thus, when the vehicle device 206 generates (264) a list populated with entries that pair each offer with each service provider 220 offering the offer for the first time, the list contains the best offers that each service provider 220 can offer.

In other embodiments, upon receipt of the offers and/or any other service provider information, the vehicle device 206 may omit sending a request to the central collision management server 205 to share the offers with the other service providers 220, and instead generate (264) a list populated with entries that pair each offer with each service provider 220 offering the offer. The list may also be populated with the service provider information related to the service providers 220, if any. Thus, when the vehicle device 206 then sends (266) the generated list to the central collision management server 205 to share (268) offers with the service providers 220, each service provider 220 may view not only each other's offers, but all information pertaining to each service provider, such as their availability, reviews, reliability scores, and the like. Some of the service providers 220 may desire to provide updated offers (e.g., a lower offer) to win the individuals' favor and accordingly transmit (270) the updated offers to the central collision management server 205, which would then forward (272) the updated offers to the vehicle device 206. The vehicle device 206 subsequently may update (274) the generated list with the updated offers accordingly.

The vehicle device 206 may then display (276) the generated list to enable selection of one of the service providers 220 for scheduling an appointment. The order in which the service providers 220 appear on the list at the vehicle device 206 may be based upon various factors. In one embodiment, the vehicle device 206 and/or the central collision management server 205 may identify the distances between the service providers and the location of the collision event, and may prioritize any service provider(s) that is closer to the collision event than are the other service provider(s) on the list. In another embodiment, the vehicle device 206 and/or the central collision management server 205 may account for any service provider(s) at which the user of the vehicle device 206 has completed a previous appointment or service. For example, the user of the vehicle device 206 may have a preferred or frequented body shop, which may be sourced from calendar application or similar record.

In embodiments, the vehicle device 206 may display the offers along with the service provider information in a user interface so that a user of the vehicle device 206 may view the offers and service provider information prior to selecting and scheduling an appointment with a service provider. The vehicle device 206 may automatically schedule (278) an appointment with the selected service provider upon receiving, via the user interface, a selection for an appointment. In particular, a user may select to schedule an appointment with the service provider at an indicated time and date. In some situations, the appointment may be for immediate assistance (e.g., scheduling a tow truck or calling an ambulance).

Although not illustrated in FIG. 2, after receiving the selection, the vehicle device 206 may send a confirmation to the central collision management server 205 that confirms selection of the appointment. The central collision management server 205 may record the confirmation and forward the confirmation to the selected service provider 220. The selected service provider 220 may accordingly record that the appointment has been confirmed and may send an acknowledgement of the appointment confirmation to the central collision management server 205. The central collision management server 205 may, in turn, send the acknowledgement of the appointment confirmation to the vehicle device 206. It should be appreciated that the vehicle device 206 may confirm the appointment directly with the service provider 220 (i.e., without communicating with the central server 205). In an implementation, the vehicle device 206 may automatically interface with a calendar application to add the appointment to a calendar of the user. Accordingly, at this point in processing, the user of the vehicle device 206 has a confirmed appointment with the service provider 220.

It should be appreciated that the central collision management server 205 may automatically schedule, for the user of the vehicle device 206, the appointment with the service provider 220 without involving any user selection. In an implementation, the central collision management server 205 may automatically schedule the appointment with the service provider 220 in response to receiving the availability of the service provider 220, and optionally based upon an availability of the user (e.g., such as an availability indicated in a calendar application of the vehicle device 206). In automatically scheduling the appointment, the central collision management server 205 may account for an urgency of the appointment (e.g., immediate assistance needed, or an appointment that may be less urgent such as body work). In this regard, the central collision management server 205 may facilitate identifying the relevant service provider 220 and the available appointment, and scheduling the appointment, without needing input from the user of the vehicle device 206.

FIGS. 3A-3D illustrate exemplary interfaces associated with managing collision events. One or more electronic mobile devices may be configured to display the interfaces and/or receive selections and inputs via the interfaces, where the electronic mobile device(s) may be associated with an operator or passenger of an automotive device, or may be integrated into the automotive device. For example, a dedicated application that is configured to operate on the electronic mobile device may display the interfaces. It should be appreciated that the interfaces are merely exemplary and that alternative or additional content is envisioned.

Figure 3A:
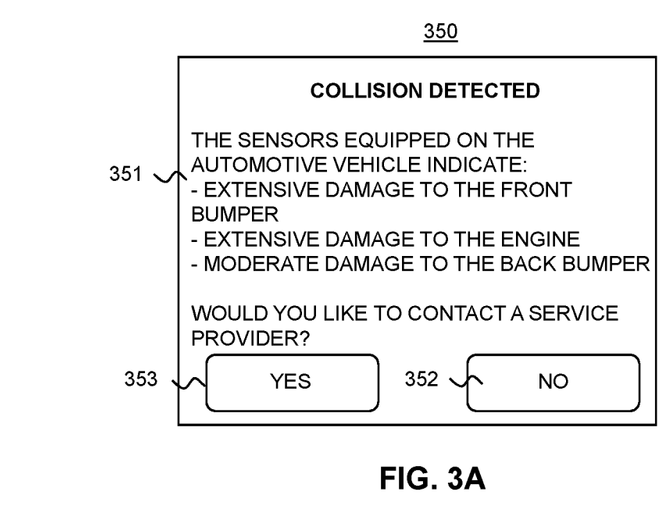
FIGS. 3A-3D depict exemplary user interfaces associated with assessing and managing collision events, in accordance with some embodiments.

FIG. 3A illustrates an interface 350 indicating that a collision event was detected. The interface 350 displays various information 351 associated with the collision event, such as a breakdown of damaged parts of the automotive device, based on the sensor data. For example, various information 351 shows that there is extensive damage to the front bumper and engine, and moderate damage to the back bumper. Other information that the interface 350 shows is contemplated, such as a time and location of the collision event, velocity (i.e., the velocity of the corresponding automotive device at the time of the collision), and the probability of passenger injury. Additionally, the interface 350 prompts the individual to select whether a service provider should be called via a "NO" selection 352 or a "YES" selection 353. In embodiments, if the individual selects the "NO" selection 352, the electronic mobile device may dismiss the interface 350, and if the individual selects the "YES" selection 353, the electronic mobile device may initiate a reverse communication session to contact a service provider.

Figure 3B:
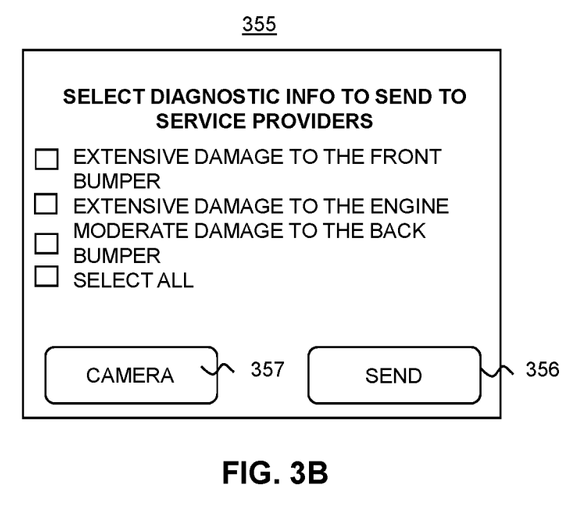

FIG. 3B illustrates an interface 355 indicating diagnostic information to send to service providers. The interface 355 may display the same breakdown of damaged parts of the automotive device as in FIG. 3A, but this time the individual may select the particular damage for the service providers to offer on. For example, interface 355 shows that there is extensive damage to the front bumper and engine, and moderate damage to the back bumper, but the individual may only want the front bumper and engine fixed. The individual can select the checkboxes corresponding to the damages to the front bumper and engine and click the "SEND" button 356. In this way, the damage rating may be considered to be determined according to selected itemized diagnostic information. In other embodiments, the individual may click the "CAMERA" button 357 to send pictures and/or videos of the collision event to the service providers via the central collision management server 205 either as a substitute for the diagnostic information or in addition to the diagnostic information. The vehicle device 206 and/or central collision management server 205 may be equipped with image processing capabilities to generate a damage rating based upon the pictures and/or videos of the collision event for service providers to offer on.

Figure 3C:
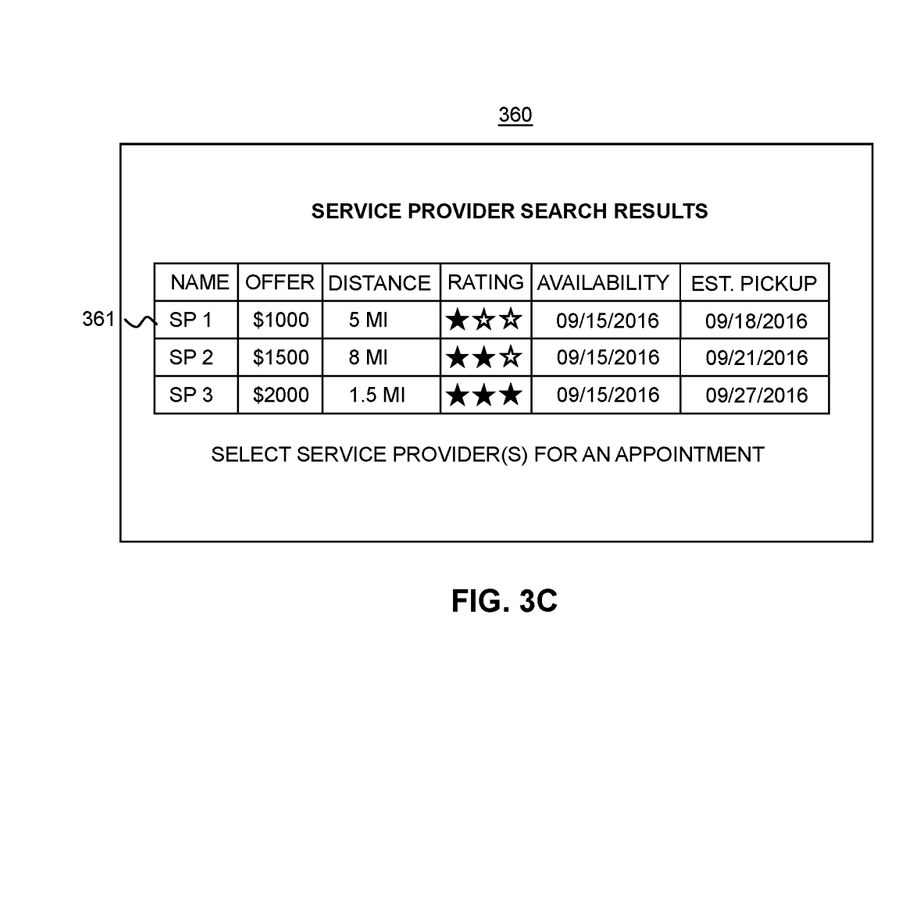

FIG. 3C illustrates an interface 360 that displays the service providers capable of servicing the automotive device. For example, the interface 360 displays a generated list 361 having entries of three service providers, SP 1-3, paired with their offers. Although three entries are shown, any number of entries is contemplated. The service provider data (e.g., distance from the collision event, reviews/ratings of their services, their availabilities, and estimated date of completing their services) described in FIG. 2 may be associated to any of the entries according to its association with service providers, SP 1-3. In other embodiments, list 361 may have additional information for any of the entries, such as any promotional specials offered by the service provider, or prior appointments completed by the service provider. The interface 360 may be configured to rearrange the order of the entries according to the service provider data. The interface 360 may also enable the user to select a particular service provider for appointment.

Figure 3D:
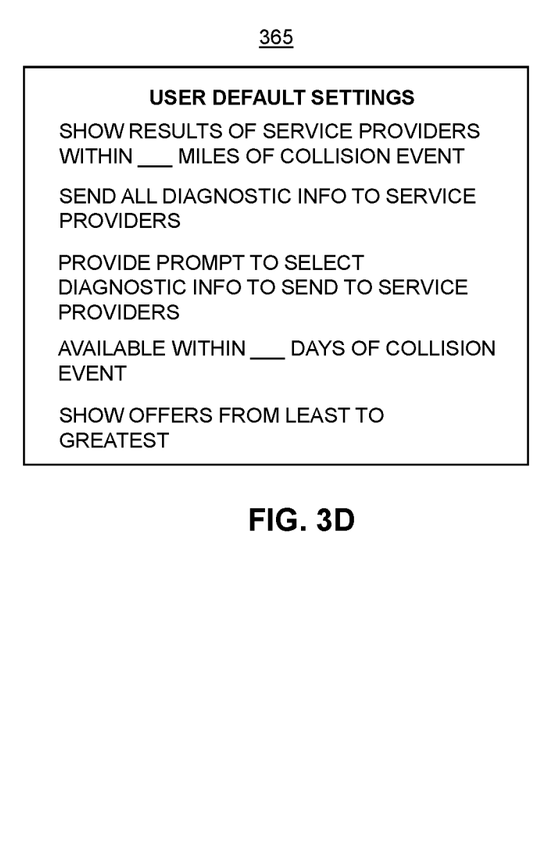

FIG. 3D illustrates an interface 360 indicating user default settings. A user may configure the user default settings to control the results displayed in interface 360. For example, a user may desire to show offers only from service providers that are within a particular distance from the collision event, or that are available within a particular timeframe from the collision event. The user may want to see offers in a particular order, such as from least to greatest. The user may desire to always send all diagnostic information to service providers, or alternatively may want to be given the freedom to choose which specific diagnostic information to send to service providers. Other user default settings are contemplated.

Figure 4:
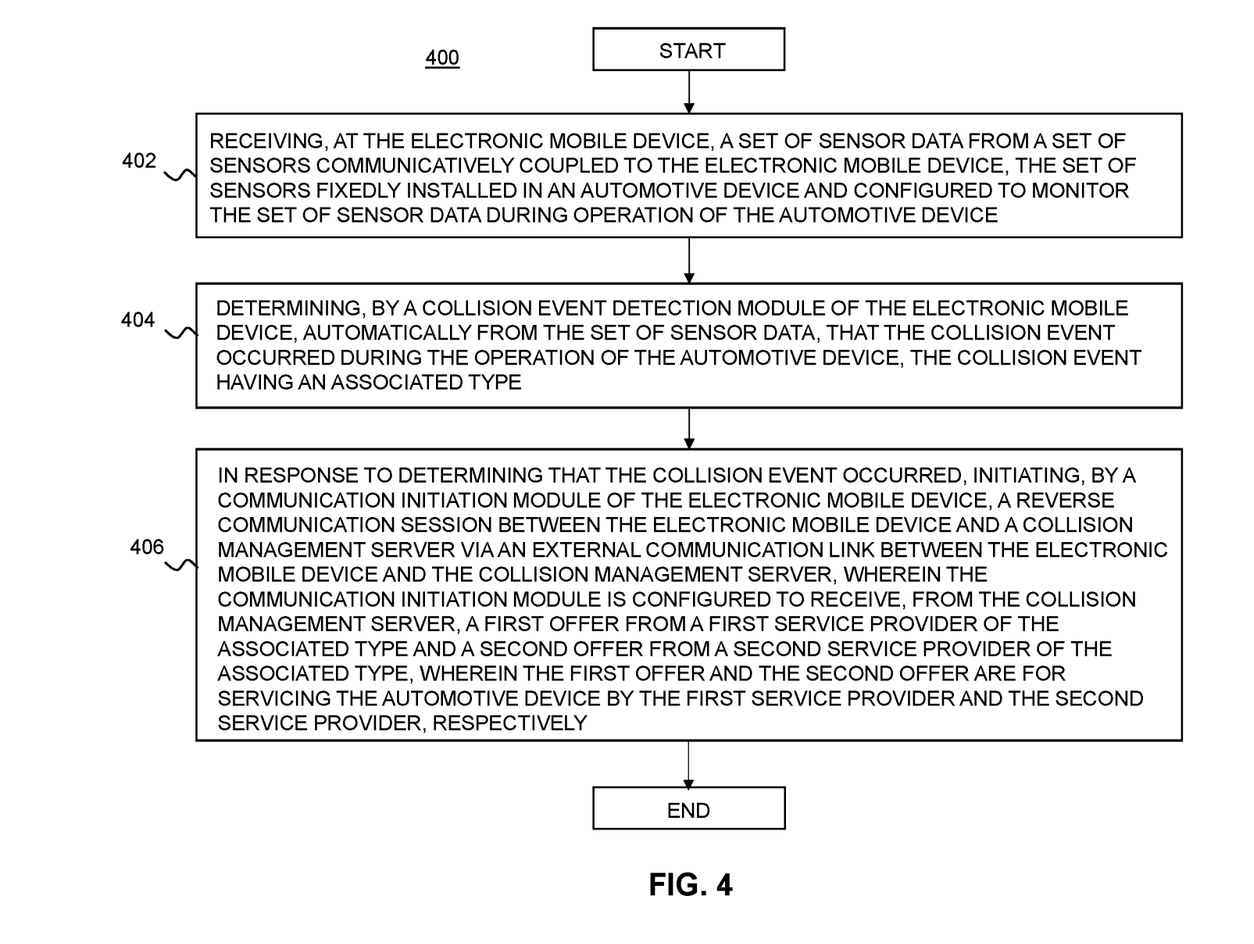
FIG. 4 is an exemplary flow diagram associated with assessing and managing collision events, in accordance with some embodiments.

FIG. 4 depicts a block diagram of an exemplary method 400 of managing collision events. The method 400 may be implemented by the vehicle device 206 shown in FIG. 2. The method 400 may be stored to memory in the vehicle device 206 as one or more instructions or routines.

The method 400 may begin with the electronic mobile device receiving (block 402) a set of sensor data from a set of sensors communicatively coupled to the electronic mobile device. The set of sensors (e.g., sensors configured to collect telematics data associated with operation of the automotive device) may be fixedly installed in an automotive device and configured to monitor the set of sensor data during operation of the automotive device. In embodiments, the set of sensors may be incorporated within the electronic mobile device and/or may be external to the electronic mobile device.

The method 400 may proceed by determining (block 404), by the electronic mobile device, automatically from the set of sensor data, that the collision event occurred during the operation of the automotive device. In embodiments, the collision event may have an associated type. In one implementation, the set of sensor data may indicate damage to the automotive device. For example, the set of sensors may include a crash sensor that detects a collision event, or the set of sensors may include an image sensor that captures one or more digital images that depict automotive device damage. In another implementation, the set of sensor data may indicate that an individual associated with the collision event (e.g., a passenger of the automotive device) is injured, or that there is a higher probability of bodily injury.

The method 400 may proceed by initiating (block 406) by the electronic mobile device, in response to determining that the collision event occurred, a reverse communication session between the electronic mobile device and a collision management server via an external communication link between the electronic mobile device and the collision management server. The electronic mobile device may be configured to receive, from the collision management server, a first offer from a first service provider and a second offer from a second service. The first service provider and the second service provider may have the same associated type. The first offer and the second offer are for servicing the automotive device by the first service provider and the second service provider, respectively.

Figure 5:
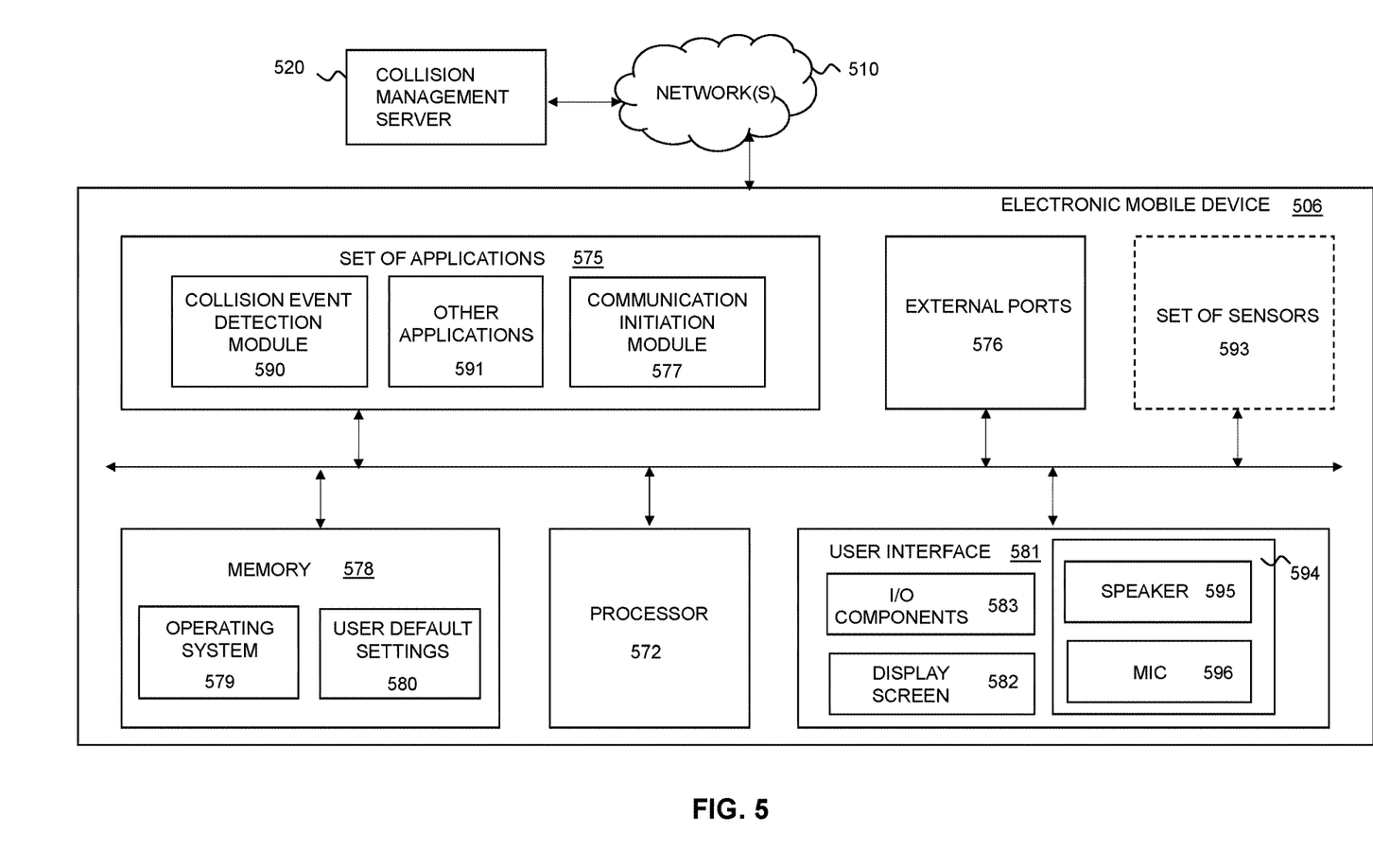
FIG. 5 is an exemplary block diagram of an exemplary electronic mobile device, in accordance with some embodiments.

FIG. 5 illustrates a diagram of an exemplary electronic mobile device 506 (such as the vehicle device 206 as discussed with respect to FIG. 2) in which the functionalities as discussed herein may be implemented. It should be appreciated that the electronic mobile device 506 may be configured to connect to and communicate with various entities, components, and devices, as discussed herein.

The electronic mobile device 506 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be a collision event detection module 590 configured to assess and manage collision events. The collision event detection module 590, which may be stored in memory 578, may be executed by processor 572 to determine automatically from sensor data that a collision event occurred during operation of an automotive device. The example collision event detection module 590 may retrieve sensor data from the set of sensors 593 according to any suitable protocols and formats associated with the set of sensors 593. For example, the collision event detection module 590 may retrieve data in the form of comma separated values, tab separated values, text files, time series, etc. The collision event detection module 590 may reformat, shape, aggregate, or otherwise manipulate the retrieve data to determine that a collision event occurred during operation of an automotive device. The collision event detection module 590 may also assign an associated type to the collision event. Although the example collision event detection module 590 is described as one module, other implementations including any number of separate modules, algorithms, engines, routines, etc. may be implemented having the functionality of the collision event detection module 590.

Similarly, the set of applications 575 may further include a communication initiation module 577 configured to communicate data via one or more networks 510 in order to initiate a reverse communication session with the collision management server 520. The communication initiation module 577, which may be stored in memory 578, may be executed by processor 572. According to some embodiments, the communication initiation module 577 may include instructions for one or more transceivers (e.g., WWAN, WLAN, and/or WPAN transceivers) functioning in accordance with IEEE standards, 3GPP standards, or other standards, and configured to receive and transmit data via one or more external ports 576. For example, the communication initiation module 577 may transmit a damage rating and/or a location of the automotive device to the collision management server 520 via the network 510. In response, the communication initiation module 577 may receive, via the network 510, offers from one or more service providers based on the damage rating and/or the location of the automotive device. The communication initiation module 577 may also receive service provider data, such as a reliability score, a review, a service provider location, an availability, an estimated time of repair, or a distance from a location of the automotive device associated with one or more service providers, and further associate the received service provider data to the respective one or more service providers. The processor 572, by executing the communication initiation module 577, may generate a list populated with entries pairing offers with the one or more service providers offering the offers. In some embodiments, the list may also be populated with service provider data associated to the respective one or more service providers.

To facilitate counteroffers, the communication initiation module 577 may send the list that is populated with service providers, offers, and/or service provider data to the collision management server 520 to share the offers with the service providers. For example, service provider SP1's offer may be shared with service provider SP2, and service provider SP2's offer may be shared with service provider SP1. The communication initiation module 577 may then receive, via the collision management server 520, any updated offers from any of the service providers, and the list may be updated accordingly. For example, service provider SP1 may send an updated offer (e.g., lower offer) in response to knowing service provider SP2's offer. The list may be stored in memory 578.

It should be appreciated that one or more other applications 591 are envisioned. The one or more applications 591 may call the collision event detection module 590 or any other application or module, such as communication initiation module 577, to execute the application 591.

The processor 572 may interface with the memory 578 to execute the operating system 579 and the set of applications 575. According to some embodiments, the memory 578 may also store user default settings data 580 that may indicate certain preferences or past appointments with various service providers as described in FIG. 3D. The memory 578 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic mobile device 506 may further include a user interface 581 configured to present information to a user and/or receive inputs from the user, as shown in FIGS. 3A-3D. As shown in FIG. 5, the user interface 581 may include a display screen 582 and I/O components 583 (e.g., ports, capacitive or resistive touch sensitive input panels, keys, buttons, lights, LEDs). The processor 572 may generate the list populated with entries pairing offers with service providers, along with any other service provider data, so that the display screen 582 may display the generated list to enable selection of at least one of the service providers for scheduling an appointment. According to some embodiments, the user may access the electronic mobile device 506 via the user interface 581 to review information and/or perform selection of at least one of the service providers and other functions. The user interface 581 may also include an audio module 594 that may include a speaker 595 and a microphone 596.

The electronic mobile device 506 may further include a set of sensors 593 such as one or more accelerometers, gyroscopes, imaging sensors, proximity sensors, collision sensors, damage sensors, ultrasonic sensors, and location modules. The set of sensors 593 may also include other types of sensors such as light sensors, infrared sensors, touch sensors, NFC components, and other sensors. The set of sensors 593 may be integrated within the electronic mobile device 506, fixedly installed in the automotive device to which the electronic mobile device 506 may connect, or otherwise associated with the automotive device.

In some embodiments, the electronic mobile device 506 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, the modules described herein may be implemented mechanically or electronically. For example, a module may comprise dedicated circuitry or logic that may be permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that may be temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules may provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it may be communicatively coupled. A further module may then, at a later time, access the memory device to retrieve and process the stored output. Modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic mobile device of managing a collision event, the method comprising:
   receiving, at the electronic mobile device, a set of sensor data from a set of sensors communicatively coupled to the electronic mobile device, the set of sensors fixedly installed in an automotive device and configured to monitor the set of sensor data during operation of the automotive device;
   determining, by a collision event detection module of the electronic mobile device, automatically from the set of sensor data, that the collision event occurred during the operation of the automotive device, the collision event having an associated type; and
   in response to determining that the collision event occurred, initiating, by a communication initiation module of the electronic mobile device, a reverse communication session between the electronic mobile device and a collision management server via an external communication link between the electronic mobile device and the collision management server, wherein the communication initiation module is configured to receive, from the collision management server, a first offer from a first service provider of the associated type and a second offer from a second service provider of the associated type, wherein the first offer and the second offer are for servicing the automotive device by the first service provider and the second service provider, respectively.

2. The computer-implemented method of claim 1, wherein the initiating of the reverse communication session further comprises:
   automatically transmitting at least one of a damage rating or a location of the automotive device to the collision management server; and
   receiving, from the collision management server, the first offer and the second offer according to the at least one of the damage rating and the location of the automotive device.

3. The computer-implemented method of claim 2, wherein the damage rating is determined from at least one of the set of sensor data, a picture capturing the collision event, or a video capturing the collision event.

4. The computer-implemented method of claim 3, wherein the damage rating is determined according to selected itemized diagnostic information.

5. The computer-implemented method of claim 1, wherein the initiating of the reverse communication session further comprises:
   receiving, from the collision management server, service provider data comprising at least one of a reliability score, a review, a service provider location, an availability, an estimated time of repair, or a distance from a location of the automotive device associated with at least one of the first service provider or the second service provider; and associating the service provider data to at least one of the first service provider or the second service provider.

6. The computer-implemented method of claim 1, further comprising:

generating a list populated with a first entry pairing the first offer with the first service provider and a second entry pairing the second offer with the second service provider; and displaying the generated list to enable selection of at least one of the first service provider or the second service provider for scheduling an appointment.

7. The computer-implemented method of claim 6, wherein the displaying comprises rearranging the first entry and the second entry within the generated list according to the service provider data.

8. The computer-implemented method of claim 6, further comprising:

sending the list to the collision management server to share the first offer with the second service provider and the second offer with the first service provider;

receiving, via the collision management server, at least one of an updated first offer from the first service provider or an updated second offer from the second service provider in response to the sending of the list; and updating the list by replacing at least one of the first offer or the second offer with the updated first offer or the updated second offer, respectively.

9. The computer-implemented method of claim 1, further comprising:

automatically scheduling, via a wireless network connection, an appointment with at least one of the first service provider or second service provider.

10. The computer-implemented method of claim 9, wherein automatically scheduling the appointment with at least one of the first service provider or the second service provider comprises:

connecting to the at least one of the first service provider or the second service provider via the wireless network connection;

sending, to the at least one of the first service provider or the second service provider via the wireless network connection, a request to schedule the appointment; and receiving, from the at least one of the first service provider or the second service provider via the wireless network connection, a confirmation of the appointment.

11. An electronic mobile device configured to manage collision events, comprising:

a transceiver configured to communicate via a wireless network connection;

a memory configured to store non-transitory computer executable instructions; and a processor configured to interface with the transceiver and the memory, wherein the processor is configured to execute the non-transitory computer executable instructions to cause the processor to:

receive a set of sensor data from a set of sensors communicatively coupled to the electronic mobile device, the set of sensors fixedly installed in an automotive device and configured to monitor the set of sensor data during operation of the automotive device;

determine, automatically from the set of sensor data, that the collision event occurred during the operation of the automotive device, the collision event having an associated type;

in response to determining that the collision event occurred, initiate a reverse communication session between the electronic mobile device and a collision management server via an external communication link between the electronic mobile device and the collision management server, wherein the electronic mobile device is configured to receive, from the collision management server, a first offer from a first service provider of the associated type and a second offer from a second service provider of the associated type, wherein the first offer and the second offer are for servicing the automotive device by the first service provider and the second service provider, respectively.

12. The electronic mobile device of claim 11, wherein to initiate the reverse communication session, the processor is configured:

automatically transmit at least one of a damage rating or a location of the automotive device to the collision management server; and receive, from the collision management server, the first offer and the second offer according to the at least one of the damage rating and the location of the automotive device.

13. The electronic mobile device of claim 12, wherein the damage rating is determined from at least one of the set of sensor data, a picture capturing the collision event, or a video capturing the collision event.

14. The electronic mobile device of claim 13, wherein the damage rating is determined according to selected itemized diagnostic information.

15. The electronic mobile device of claim 11, wherein to initiate the reverse communication session, the processor is configured:

receive, from the collision management server, service provider data comprising at least one of a reliability score, a review, a service provider location, an availability, an estimated time of repair, or a distance from a location of the automotive device associated with at least one of the first service provider or the second service provider; and associate the service provider data to at least one of the first service provider or the second service provider.

16. The electronic mobile device of claim 11, wherein the processor is further configured to:

generate a list populated with a first entry pairing the first offer with the first service provider and a second entry pairing the second offer with the second service provider; and display the generated list to enable selection of at least one of the first service provider or the second service provider for scheduling an appointment.

17. The electronic mobile device of claim 16, wherein to display the generated list, the processor is further configured to rearrange the first entry and the second entry within the generated list according to the service provider data.

18. The electronic mobile device of claim 16, wherein the processor is further configured to:

send the list to the collision management server to share the first offer with the second service provider and the second offer with the first service provider;

receive, via the collision management server, at least one of an updated first offer from the first service provider or an updated second offer from the second service provider in response to the sending of the list; and update the list by replacing at least one of the first offer or the second offer with the updated first offer or the updated second offer, respectively.

19. The electronic mobile device of claim 11, wherein the processor is further configured to:

automatically schedule, via a wireless network connection, an appointment with at least one of the first service provider or second service provider.

20. The electronic mobile device of claim 19, wherein to automatically schedule the appointment with at least one of the first service provider or the second service provider, the processor is further configured to:

connect to the at least one of the first service provider or the second service provider via the wireless network connection;

send, to the at least one of the first service provider or the second service provider via the wireless network connection, a request to schedule the appointment; and receive, from the at least one of the first service provider or the second service provider via the wireless network connection, a confirmation of the appointment.

\* \* \* \* \*